W. GRAHAM.
CABLEWAY.
APPLICATION FILED APR. 22, 1918.

1,365,982.

Patented Jan. 18, 1921.
12 SHEETS—SHEET 7.

Witnesses
J. Adolph Bishop
B. M. Kent

Inventor
Willie Graham by Fisher, Freeman, Watson & Cook
Attorneys

W. GRAHAM.
CABLEWAY.
APPLICATION FILED APR. 22, 1918.

1,365,982.

Patented Jan. 18, 1921.
12 SHEETS—SHEET 8.

Witnesses
J. Adolph Bishop
B. M. Kent.

Inventor
Willie Graham
by Foster, Freeman, Watson & Coit
Attorneys

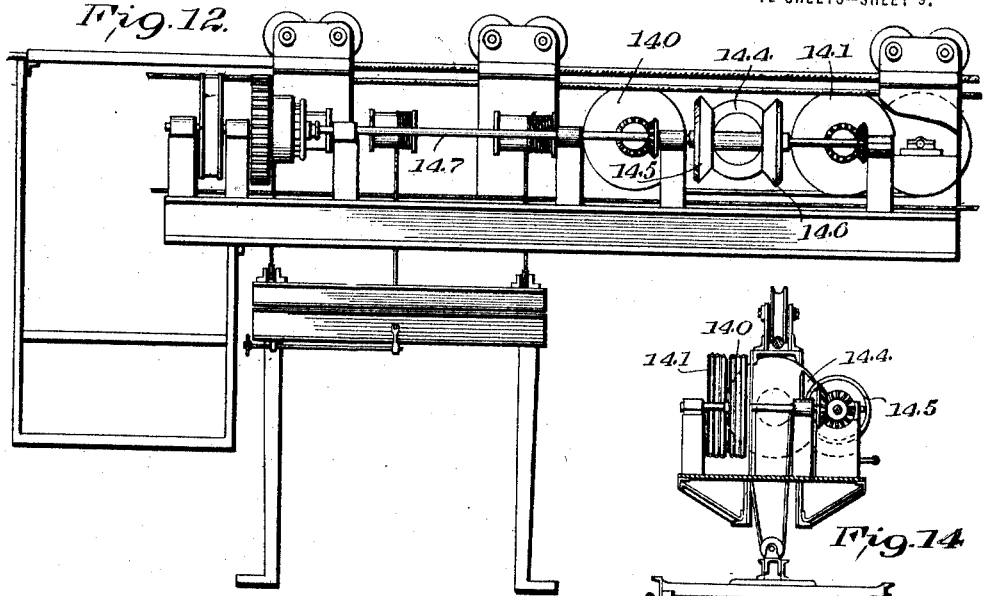

W. GRAHAM.
CABLEWAY.
APPLICATION FILED APR. 22, 1918.

1,365,982.

Patented Jan. 18, 1921.
12 SHEETS—SHEET 10.

Witnesses
J. Adolph Bishop
B. M. Kent

Inventor
Willie Graham
by Foster, Freeman, Watson & Coit
Attorneys

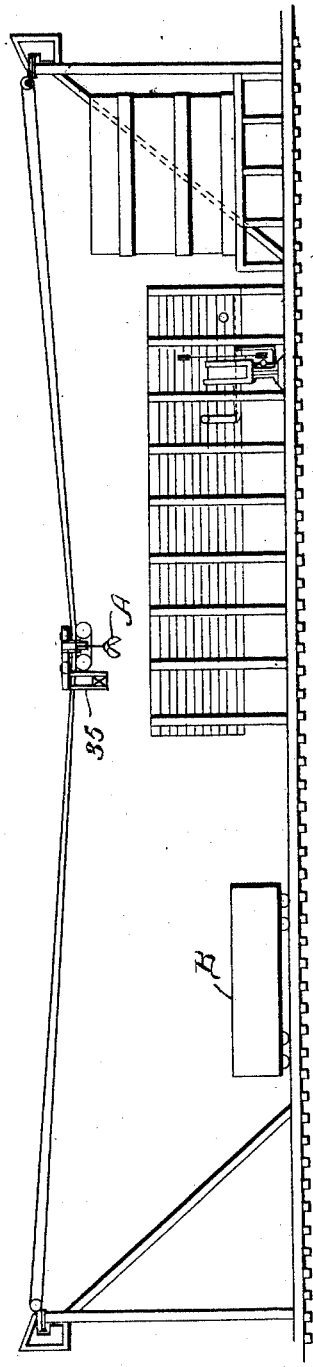

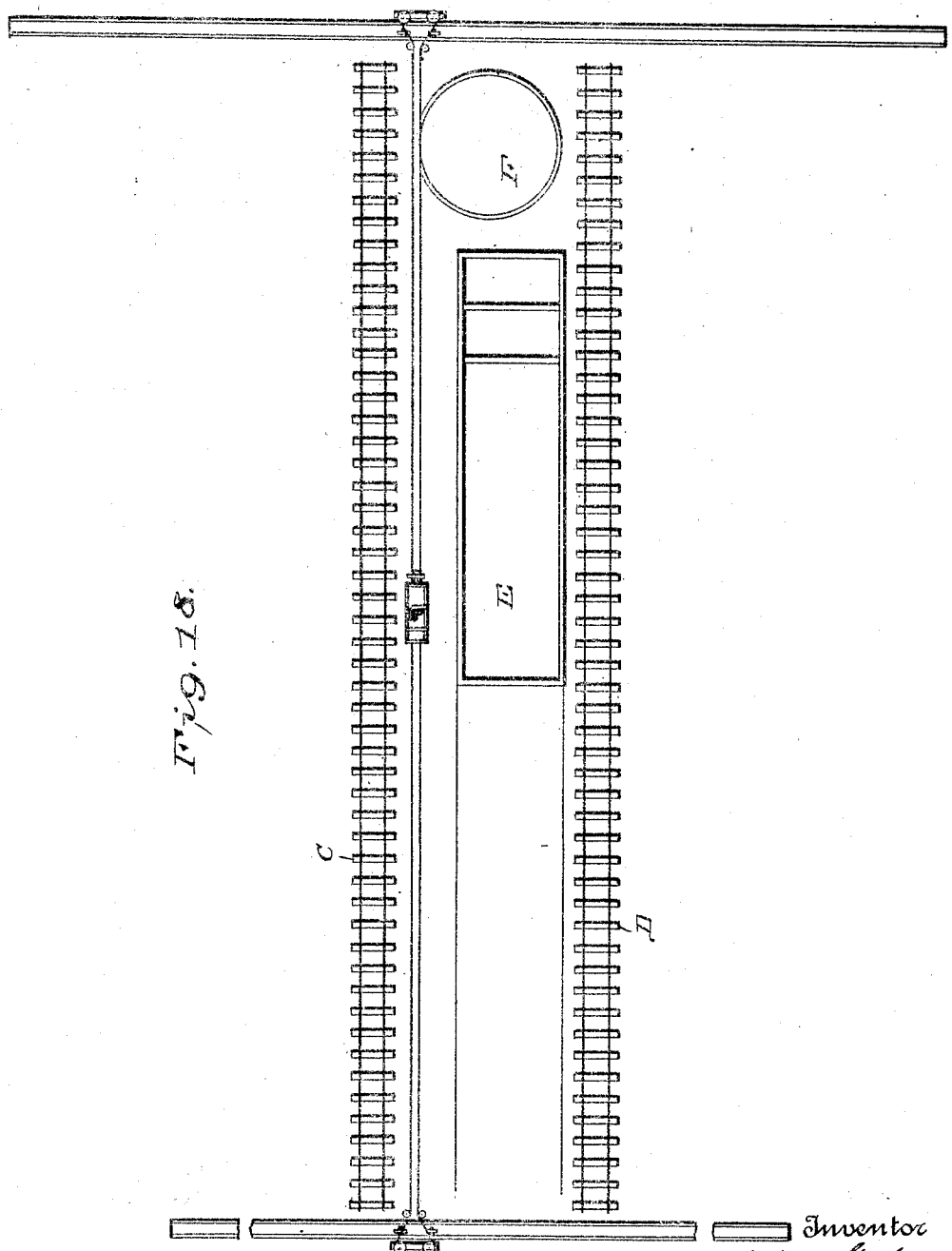

UNITED STATES PATENT OFFICE.

WILLIE GRAHAM, OF NEW ORLEANS, LOUISIANA.

CABLEWAY.

1,365,982.  Specification of Letters Patent.  Patented Jan. 18, 1921.

Application filed April 22, 1918. Serial No. 230,084.

*To all whom it may concern:*

Be it known that I, WILLIE GRAHAM, a citizen of the United States, and resident of New Orleans, parish of Orleans, State of Louisiana, have invented certain new and useful Improvements in Cableways, of which the following is a specification.

This invention relates to cable-ways adapted to handle various commodities and is particularly adapted for use over lumber yards and quarries and also over storage houses of various sorts. The cable-way may be as much as 1500 feet long and is adapted to cover a territory of any length desired.

I have shown, in a more or less diagrammatic way, various modifications and applications of the invention but it will be understood that most of the features are not limited to these modifications and applications.

The novel features of the invention will be apparent from the following description, taken in connection with the accompanying drawings.

Figure 8:
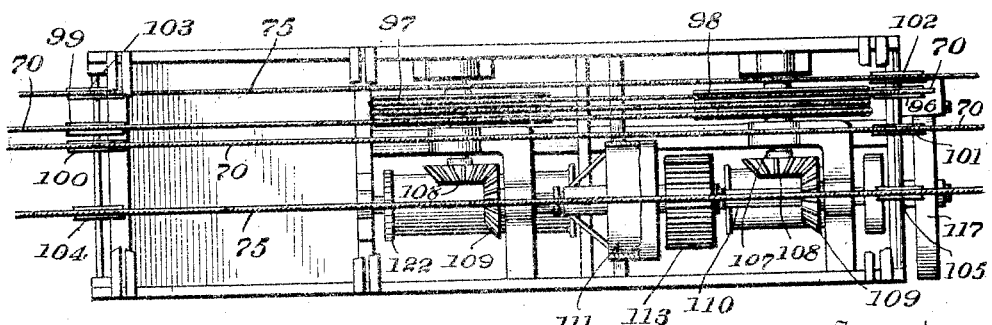
Fig. 8 is a plan view of Fig. 7, some of the parts being omitted to more clearly illustrate the other parts.

Fig. 8ª is a plan view of the cable-grips.

Figure 9:
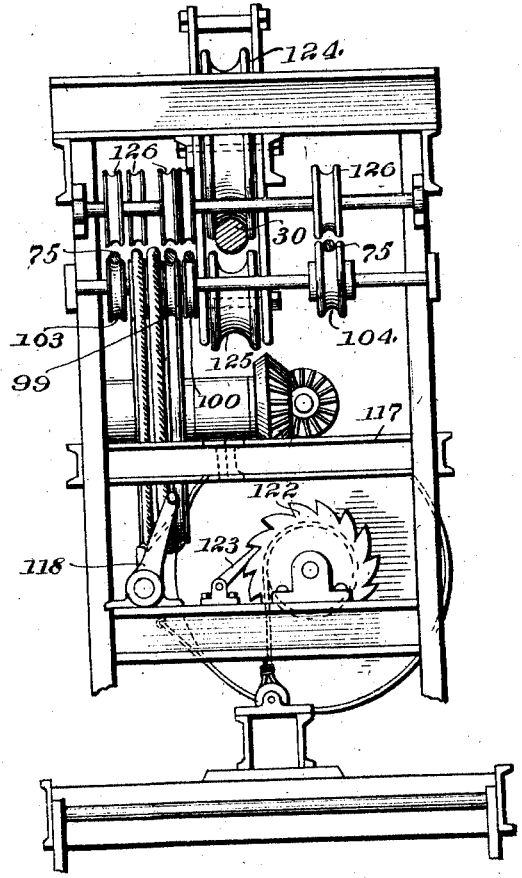

Fig. 9 is an end elevation of Fig. 8, the operator's cage being omitted.

Figure 10:
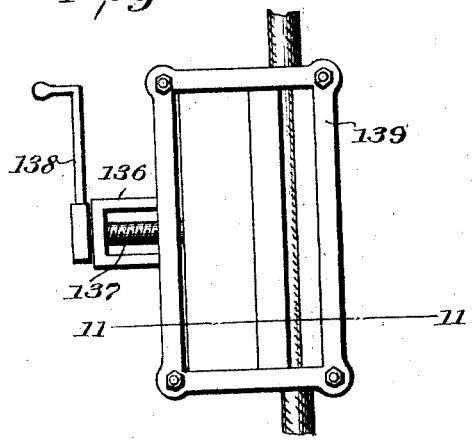

Fig. 10 is a plan view on an enlarged scale of one of the cable-grips.

Figure 11:
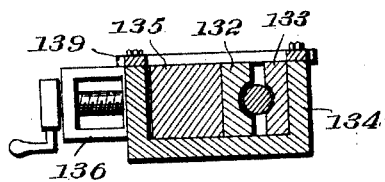

Fig. 11 is a transverse section on the line 11—11 of Fig. 10.

Fig. 12 is a side elevation of a modified form of carriage.

Fig. 13 is a plan view of Fig. 12, some of the parts being omitted.

Fig. 14 is a section on the line 14—14 of Fig. 13.

Figure 15:
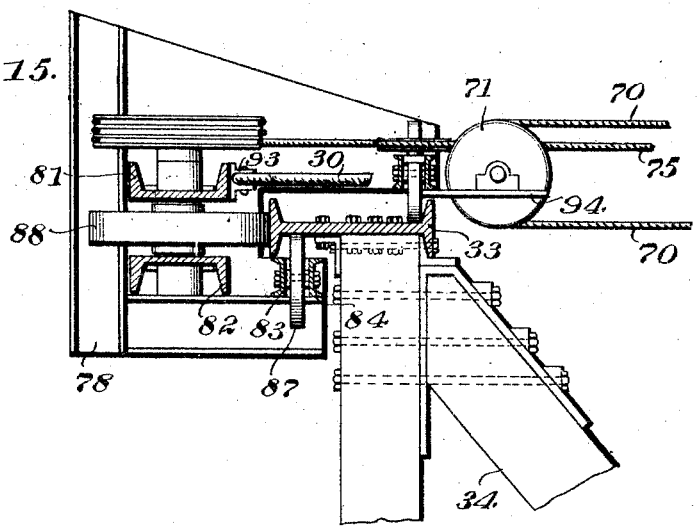
Figure 16:
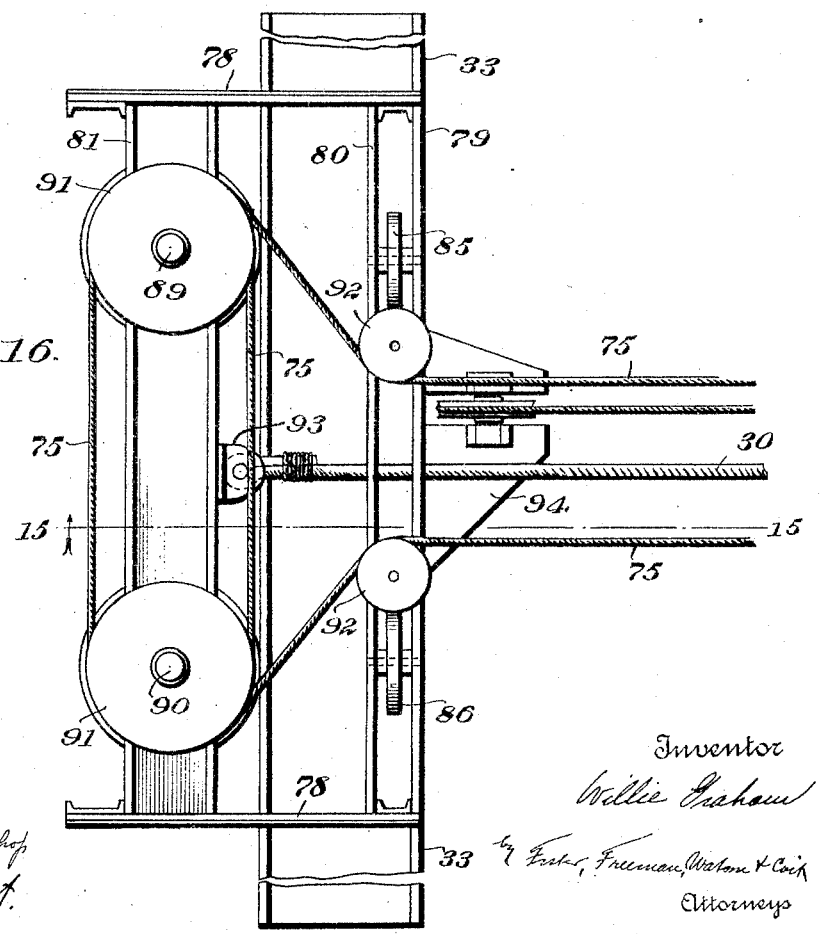

Fig. 15 is a transverse section on the line 15—15 of Fig. 16.

Fig. 16 is a plan view of the idler trolley.

Fig. 17 is a side elevation of a locomotive coaling station, showing the use of my invention in connection therewith to handle a grab-bucket.

Fig. 18 is a plan view of Fig. 17.

Figure 1:
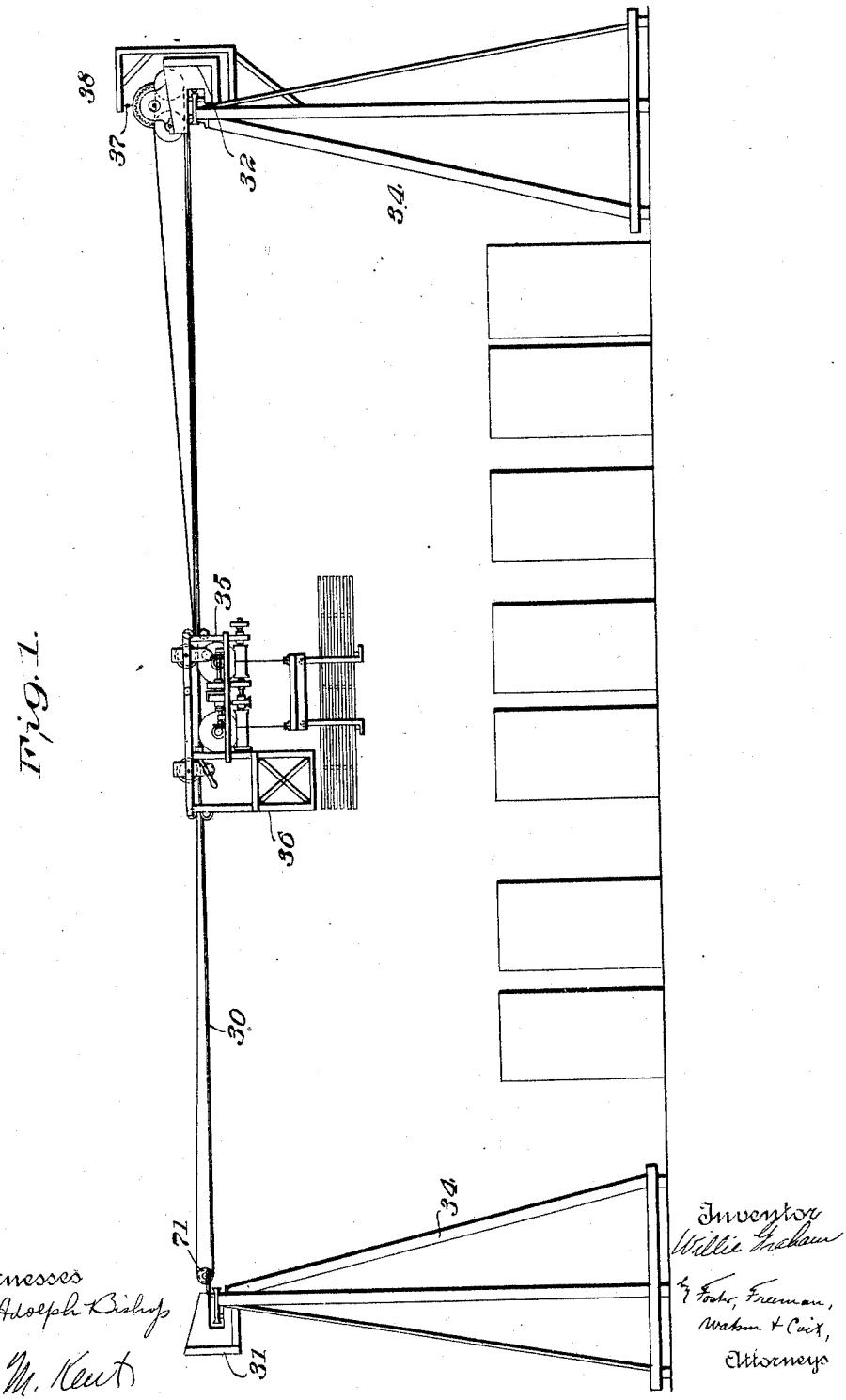
Figure 1 is a side elevation of a cable-way embodying my invention.
Figure 2:
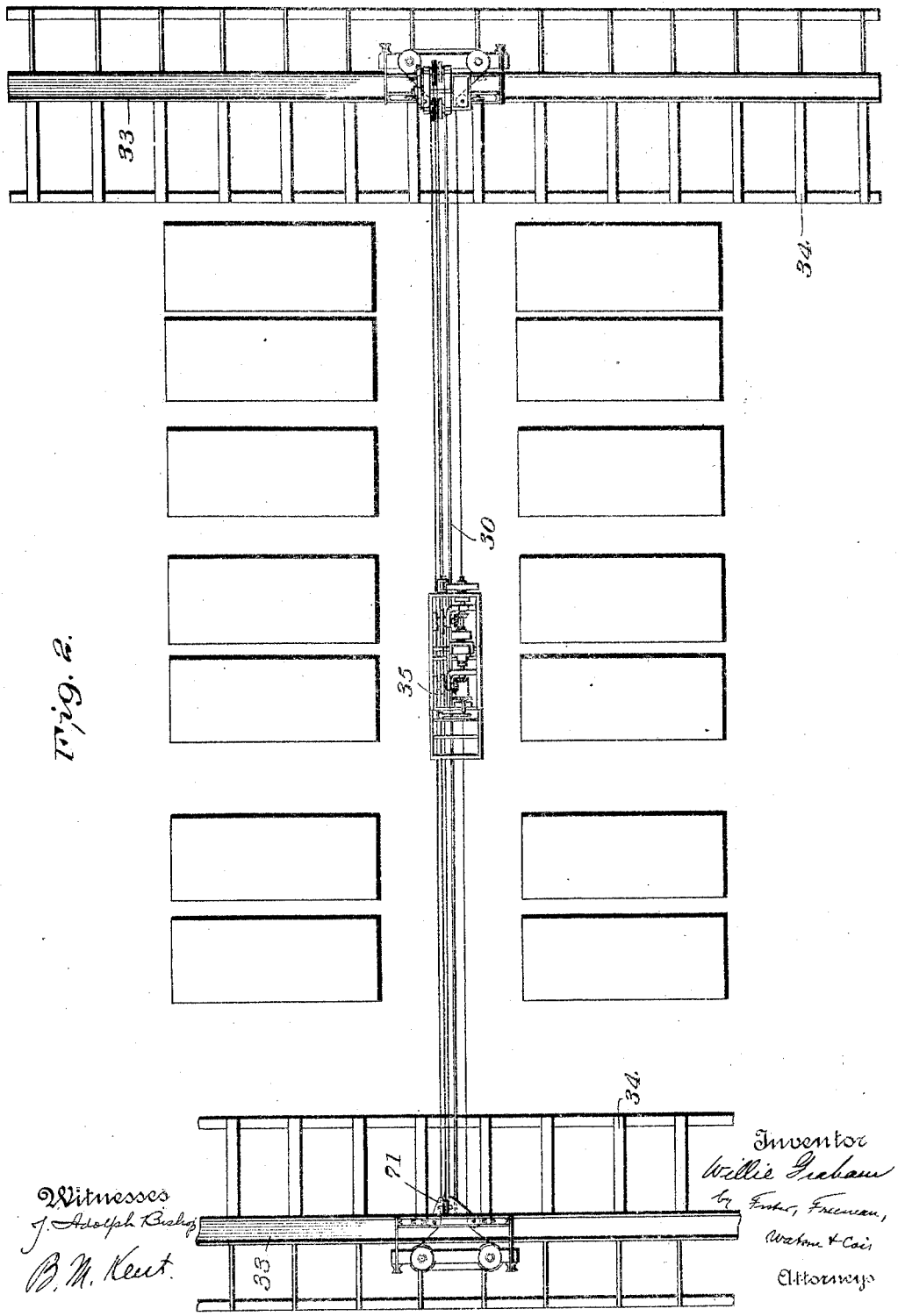
Fig. 2 is a plan view of Fig. 1.

Referring to Figs. 1 and 2, it will be seen that I have shown the invention as applied to a lumber yard. As illustrated in these figures, the apparatus comprises a suspension cable, 30, which is secured at its ends to the cars or trolleys 31 and 32. These trolleys are mounted on the elevated tracks 33 which are shown as arranged in parallel and supported on the A frames 34. The tracks 33 preferably consist of horizontally arranged I-beams which are bolted to the tops of the A frames. Mounted on the suspension cable 30 is a carriage 35 having hoisting mechanism thereon and also carrying an operator's cage 36 from which the hoisting mechanism may be controlled. The carriage is also provided with means by which the movement of the trolleys along the tracks 33 and the movement of the carriage along the suspension cable may be controlled from the operator's cage 36. Under certain circumstances I may use, instead of the parallel tracks 33, tracks which are concentrically arranged about a common center. The trolley 32 has a motor mounted thereon which is shown as receiving power from a trolley-wire 37, carried by the brackets 38, which are secured to the A frames 34.

Figure 3:
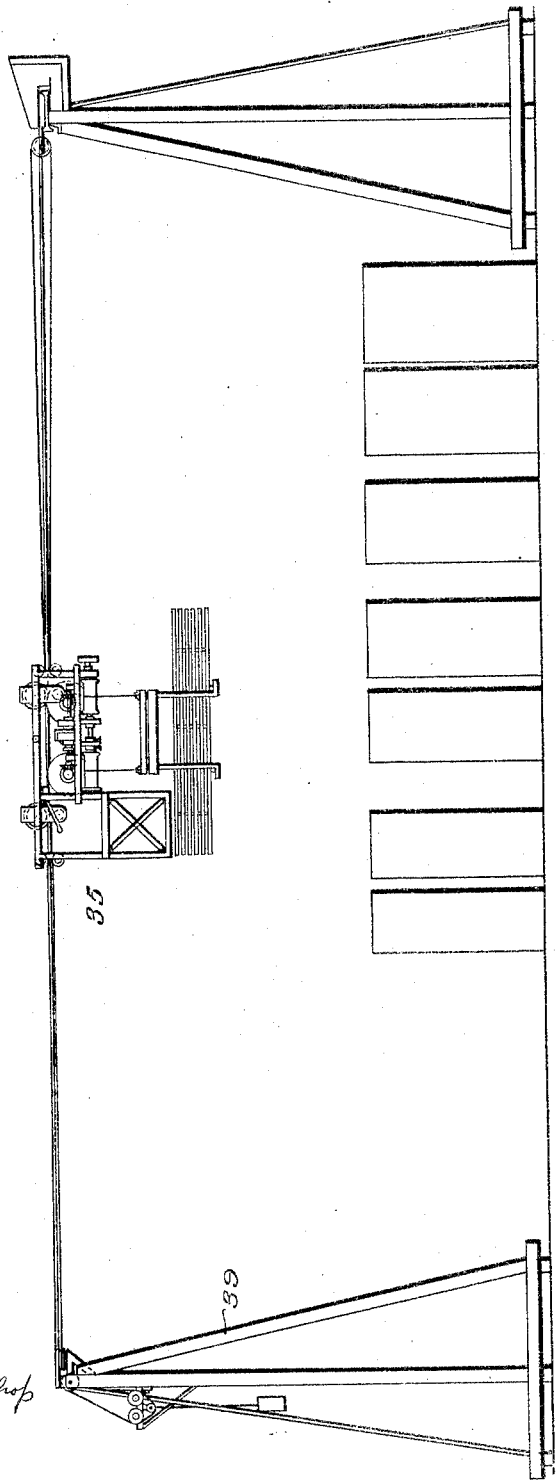
Fig. 3 is a side view of a modification of my invention showing the application thereof to a radially arranged cable-way.
Figure 4:
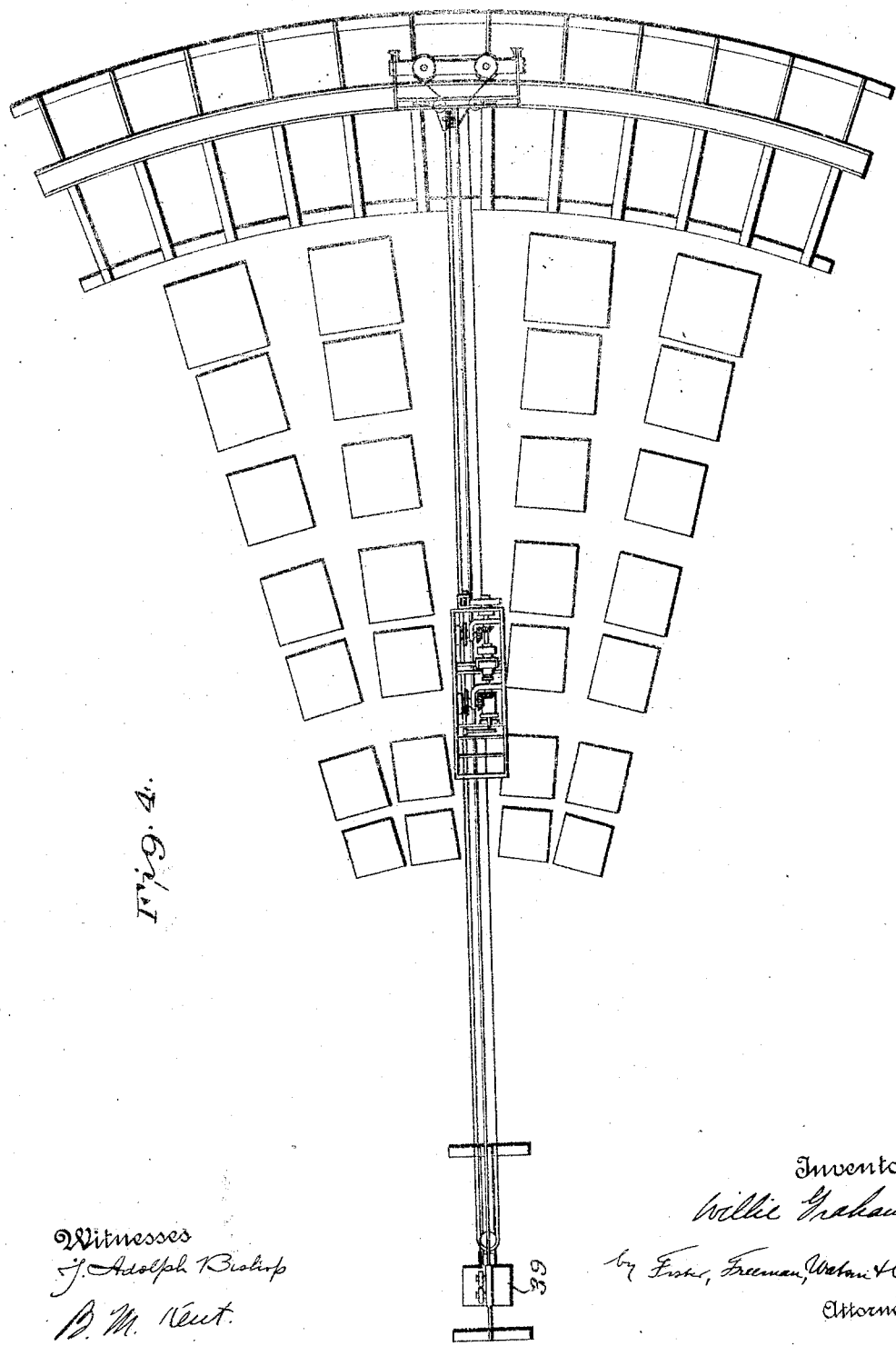
Fig. 4 is a plan view of Fig. 3.

In Figs. 3 and 4 I have shown the application of my invention to a lumber yard in which the suspension cable is secured at one end to a stationary frame, the other end being carried by a movable car or trolley. In this construction I prefer to mount the driving mechanism on the stationary frame 39, but the mode of operation of the cable-way will be similar to that of the construction shown in Figs. 1 and 2.

Figure 5:
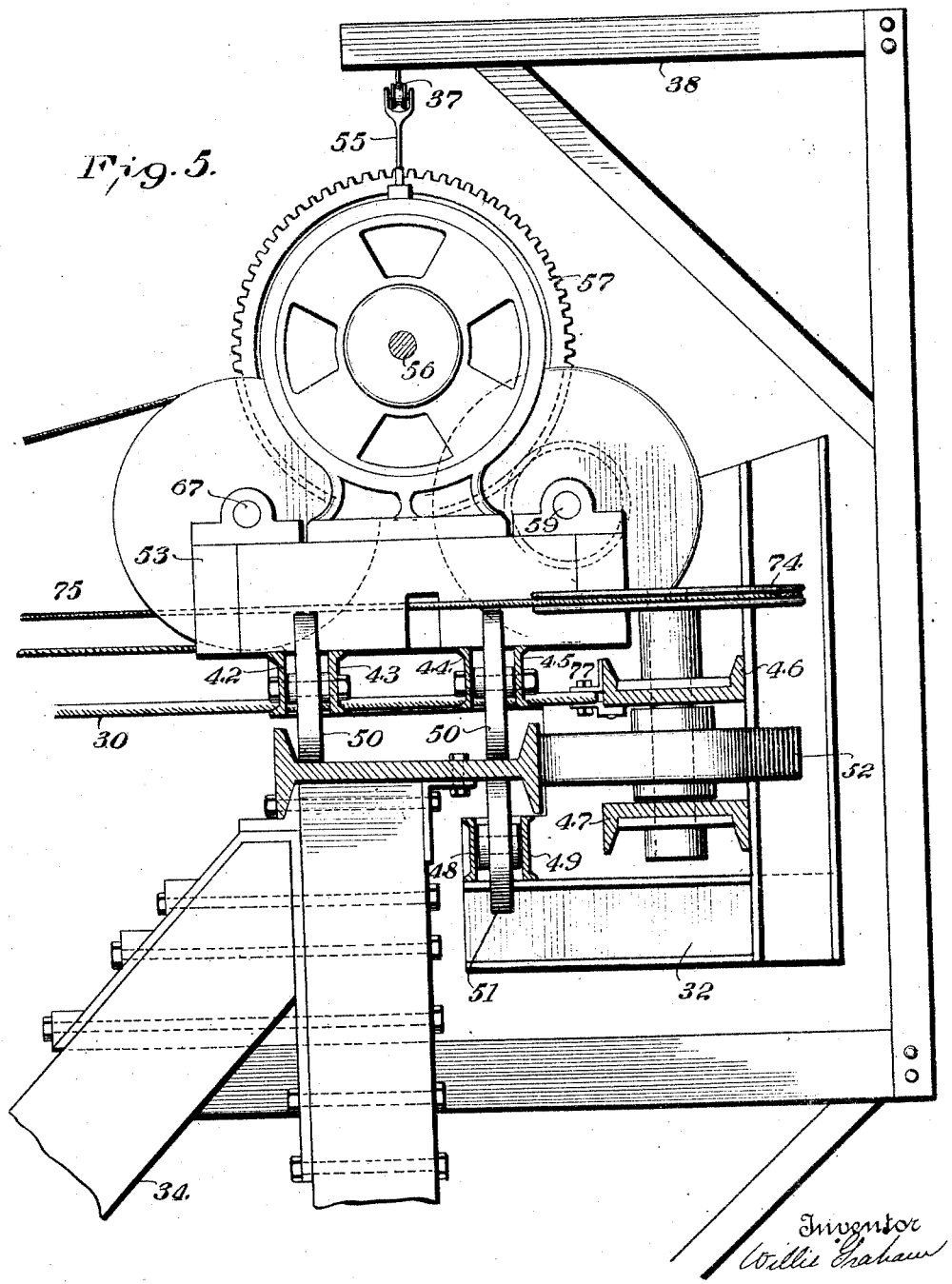
Fig. 5 is a transverse section on the line 5—5 of Fig. 6.
Figure 6:
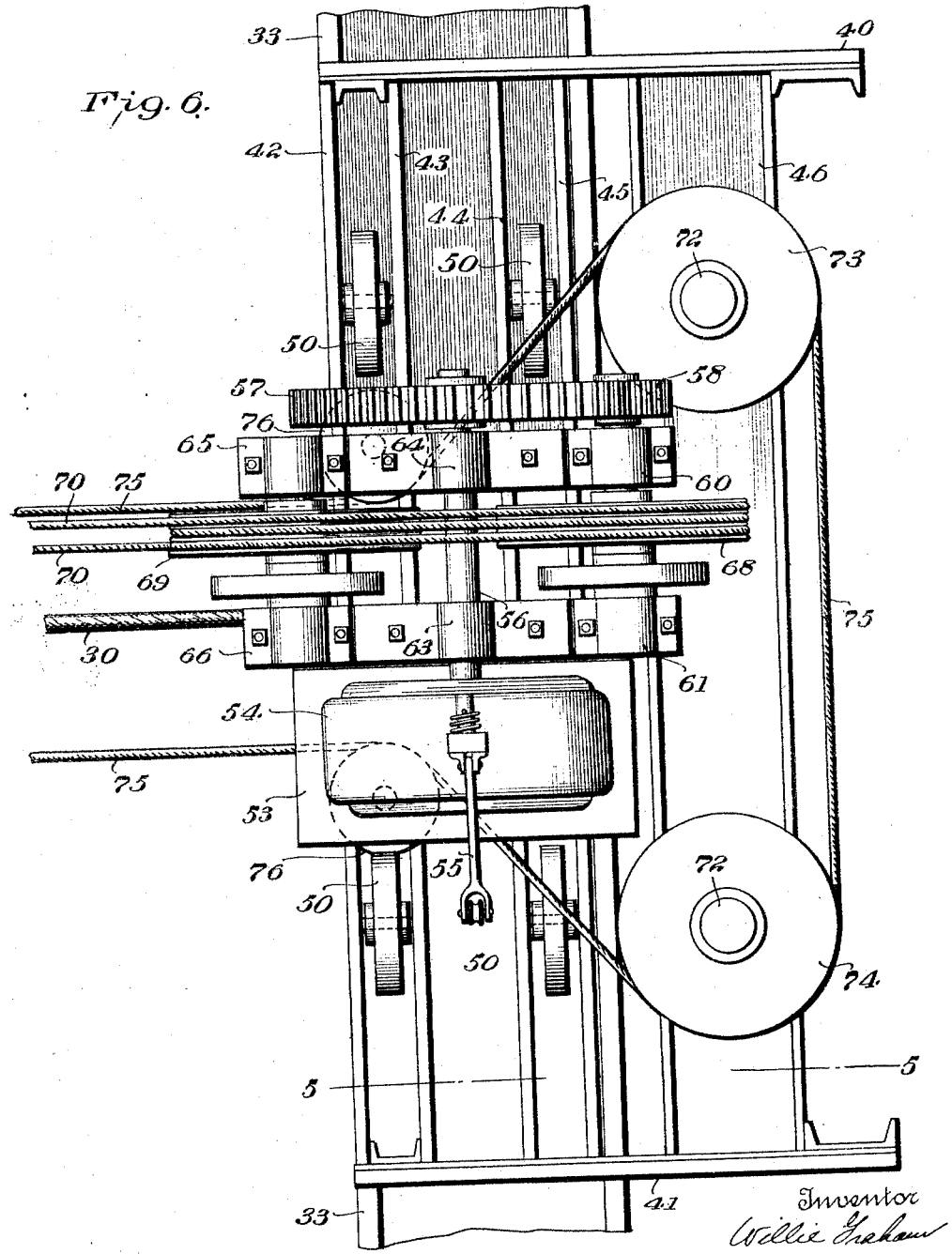
Fig. 6 is a plan view of the motor trolley.

Referring to Figs. 5 and 6, which show in detail the driving mechanism for the cable-way, it will be seen that the trolley 32 comprises end frames 40 and 41, which are connected by the beams 42, 43, 44, 45, 46, 47, 48 and 49. The beams 42 and 43; 44 and 45; and 48 and 49 are arranged to carry between them the wheels 50 and 51, the wheels 50 being arranged to run on the upper side of the track 33 and the wheels 51 being arranged to run on the under side of the track 33. Traction wheels 52 are arranged on vertical axes and run on the outside flanges of the track 33. It will be observed that the arrangement of wheels just described takes up the side pull of the cables on the trolley and also effectually supports the driving mechanism which will now be described.

Secured to the beams 42, 43, 44 and 45, is a bed-plate 53, on which is mounted a motor 54, as has been above stated. I have herein illustrated an electric motor and in Figs. 5 and 6 I have shown this motor as having mounted thereon the trolley pole 55 which is adapted to engage the trolley-wire 37, but it will be understood that instead of using electric power I may use any other suitable and convenient source of power. The shaft 56 of the motor has mounted thereon the gear 57 which meshes with the gear 58 on shaft 59. The shaft 59 is mounted in bearings 60 and 61, which are carried by beams supported on the beams 42, 43, 44 and 45. These beams also support the bearings 63 and 64 for the shaft 56 and the bearings 65 and 66 for the shaft 67. Mounted on the shafts 59 and 67 are the alined cable-drums 68 and 69. Arranged on these cable-drums is the power-cable 70 which extends through the carriage 35 and around the idler sheave 71, carried by the trolley 31, and back to the cable-drums 68 and 69. The traction wheels 52 are mounted on the vertical shafts 72, upon the upper ends of which are arranged the sheaves 73 and 74. A cable 75 is arranged on the sheaves 73 and 74 and may have a single wrap thereon or may be arranged in the manner in which the power cable 70 is arranged on the drums 68 and 69. From the sheaves 73 and 74 the cable 75 leads to guide-sheaves 76 and from these sheaves runs substantially parallel with the power cable 70, through the carriage 35 and around sheaves on the trolley 31, in the manner to be hereinafter described. The suspension cable 30 is secured to the beam 46, as shown at 77, or may be secured to the trolley in any other suitable manner.

The trolley 31 consists of the end frames 78 which are connected by the beams 79, 80, 81, 82, 83 and 84. Between the beams 79 and 80 are arranged the wheels 85 and 86 and between the beams 83 and 84 are the wheels 87. It will be observed that the wheels 85 and 86 bear upon the upper side of the track 33 and the wheels 87 bear on the under side of said track. Traction wheels 88 are arranged between the beams 81 and 82 and mounted on the vertical shafts 89 and 90 and bear against the outer flanges of the track 33. Upon the upper ends of the shafts 89 and 90 are arranged the sheave wheels 91 which receive the cable 75.

The cable 75 is shown as being wrapped around the sheaves 91 several times but it will be understood that instead of this arrangement I may use that shown in connection with the sheaves 73 and 74 on trolley 32. From the sheaves 91 the rope 75 leads around the guide sheaves 92 and out to the carriage 35. The suspension cable 30 may be secured to the trolley 31 as shown at 93 or in any other suitable manner. A frame work 94 is secured to the beam 79 and supports the idler sheave 71 around which the power cable 70 passes.

Figure 7:
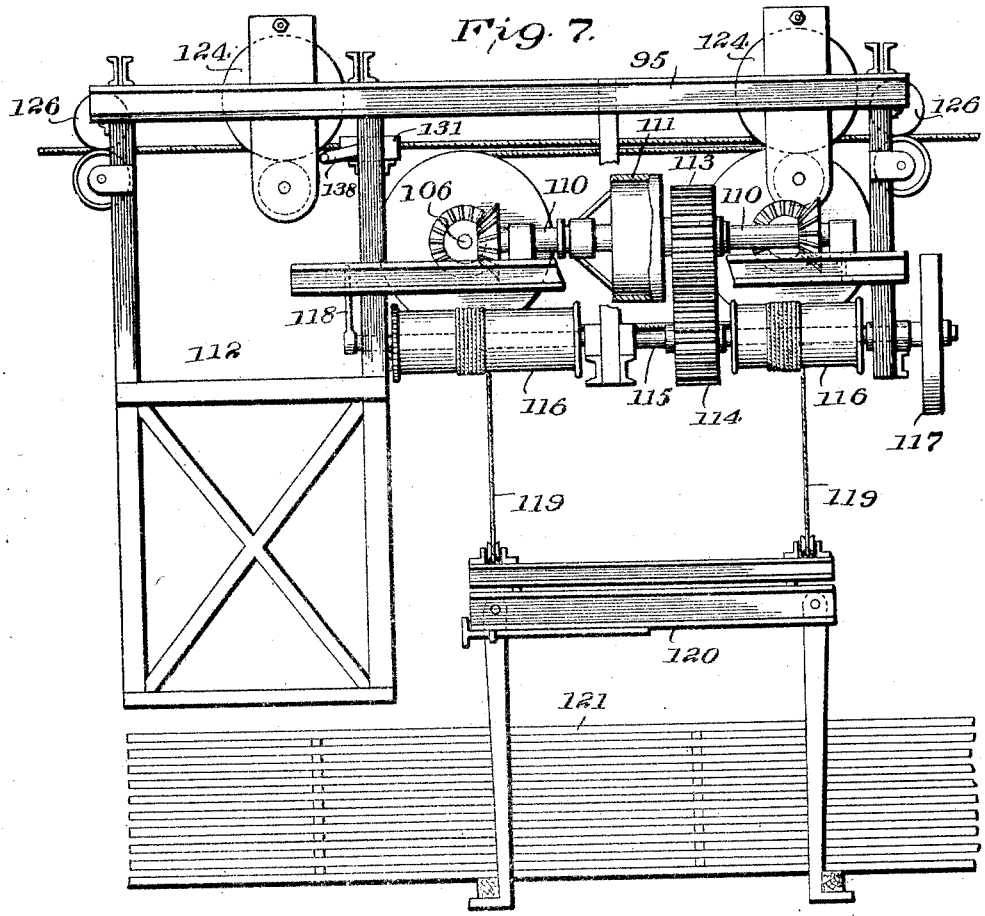
Fig. 7 is a side elevation of the carriage for the cable-way.

Referring to Figs. 7 to 9, it will be observed that the carriage comprises a frame 95 upon which is mounted the hoisting and controlling mechanism. One side of the power cable 70, leading from the trolley 32 passes over the guide sheave 96 and around the sheaves 97 and 98, making several wraps thereon and then passes over the guide sheave 99 to the idler sheave 71 on the trolley 31. The return side of the power cable passes directly through the carriage, being carried at the ends thereof on the guide sheaves 100 and 101 and thence returns to the sheaves 68 and 69 on the trolley 32. The cable 75, which is for the purpose of moving the trolleys 31 and 32 along the tracks 33, passes directly through the carriage 35, one side thereof being supported on the guide sheaves 102 and 103 and the other side thereof being supported on the guide sheaves 104 and 105.

The sheaves 97 and 98 are mounted on transversely arranged shafts 106 and 107 respectively. These shafts have arranged thereon at one end the beveled gears 108, which mesh with corresponding gears 109 on a longitudinally extending shaft 110. The shaft 110 is mounted in suitable bearings, which are supported on the frame 95 of the carriage, and has mounted thereon a clutch 111, which may be of any preferred type, and which is adapted to be operated from the operator's cage 112, carried by the carriage. The shaft 110 also has loosely mounted thereon a gear 113, which is rigidly connected with the clutch 111 and meshes with a corresponding gear 114 on a shaft 115. The shaft 115 is provided with suitable bearings, supported on the frame, and carries the winding-drums 116 and the brake-wheel 117. The brake-wheel 117 is preferably of the friction band type and is adapted to be operated by a lever 118, arranged in the operator's cage. Hoisting cables, 119, are arranged on the drums 116 and secured to a carrier 120, which is shown as of a type suitable for conveying a quantity of lumber 121. It will be understood that instead of the two winding-drums 116 I may use a single drum or, in some instances, it may be desirable to use three or more drums, the number of drums being dependent upon the character of the material to be handled. A ratchet wheel 122 having a suitable pawl 123, may be arranged on the shaft 115 and is adapted to sustain the carrier 120 in any desired position. Mounted in the frame 95 are a suitable number of trolley wheels 124 which engage the suspension cable 30 and are adapted to support the carriage thereon. Small guard wheels 125 are arranged below the trolley wheels 124 for the purpose of preventing these wheels from leaving the suspension cable.

Guard sheaves 126 may be provided at the ends of the carriage to co-act with the sheaves 96, 99, 100, 101, 102, 103 and 104 to prevent the cables 70 and 75 from leaving the same.

Cable-grips 127, 128, 129, 130 and 131 are arranged on the frame 95 and adapted to grip the cables for a purpose to be hereinafter described. These grips may be made in any suitable manner but I have shown a preferred construction in Figs. 10 and 11 in which the cable is arranged between two grooved jaws 132 and 133, arranged in a frame 134, which may be bolted to the frame of the carriage. A block 135 is arranged behind the jaw 132. The frame 134 has a side extension 136, through which passes an operating screw 137, which engages the block 135 and is provided with an operating handle 138. A rectangular frame 139 is bolted to the frame 134 and holds the jaws 132 and 133 and the block 135 in position. It will be seen that by this construction the rotation of the operating handle 138 causes the jaws 132 and 133 to grip or ungrip the cable, depending upon the direction of rotation of the handle.

The modification shown in Figs. 12, 13 and 14 embodies the principles of the construction shown in Figs. 7 to 9 with the exception that one side of the cable 75 passes around the drums 140 and 141, which are mounted on shafts 142 and 143 respectively. The shaft 142 has at one end thereof the friction cone 144, which is adapted to be engaged by either of the corresponding friction cones 145 and 146, mounted on the shaft 147, which corresponds to the shaft 110 of the other construction. Any suitable means may be provided for controlling the friction cones 145 and 146 from the operator's cage. In other respects the principles of the construction shown in Figs. 12 to 14 may be the same as in the construction shown in Figs. 7 to 9.

In Figs. 17 and 18 I have shown the application of the invention to a locomotive coaling station. In this case a grab-bucket A is handled by the carriage 35 instead of handling a load of lumber. With my invention as applied to the coaling station, coal may be taken from a car B on either of the tracks C or D and deposited in a bin E, from which it may be discharged to the locomotive. F represents a water-tank for supplying water to the locomotive.

The operation of the cable-way is as follows:

The motor 54 drives the power cable 70 continuously in the same direction. The movement of this cable rotates the drums 97 and 98 in the carriage 35 which, in turn, gives constant rotation to the shaft 110. By means of the clutch 111 and gears 113 and 114 the shaft 115 may be driven from the shaft 110. The rotation of the shaft 115 winds the cables 119 on drums 116, thereby lifting the load. When the load attains the desired height the brake 117 is applied and the pawl 123 moved into engagement with the ratchet 122, thereby sustaining the load. When it is desired to lower the load the pawl 123 is disengaged from the ratchet 122 and the load permitted to lower under the influence of the retarding action of the brake on wheel 117.

It will be noticed that the opposite portions of the cable 70 which pass through the carriage 35 run in opposite directions so that when it is desired to move the carriage along the suspension cable it is only necessary to grip one side or the other of the power cable 70, by means of grip 128 or 129, depending upon the direction in which it is desired to move the carriage. If, while the carriage is in motion along the suspension cable, one of the grips 127 or 131 is applied to the cable 75, this cable will be drawn along with the carriage and thereby rotate the traction wheels on the trolleys 31 and 32. The rotation of these wheels moves the trolleys longitudinally of the tracks 33 and thereby the position of the cable-way will be changed. It will be observed that the trolleys 31 and 32 may be moved in either direction, regardless of the direction of motion of the carriage, by merely gripping one side or the other of the cable 75. When it is desired to hold the carriage in a fixed position on the suspension cable 30 it is only necessary to set the grip 130. By means of the above described arrangement I am enabled to simultaneously raise the load and move the carriage in either direction on the suspension cable and also move the cable-way longitudinally on the tracks 33 and the power for all these operations may be obtained from the single power cable 70 and the operations controlled from the cage 112.

In the construction shown in Figs. 12, 13 and 14 by shifting the friction cones 145 and 146 longitudinally of the shaft 147 so that one or the other engages the cone 144, the drums 140 and 141 and the cable 75 may be driven and trolleys 31 and 32 moved along the tracks 33. This construction has the advantage of permitting the movement of the cable-way along the tracks 33 while the carriage is stationary on the suspension cable 30.

In the construction shown in Figs. 3 and 4 the cable-way is arranged to swing about the stationary frame 39, which preferably carries a driving mechanism for the cable 70, similar to the driving mechanism shown in Fig. 6. The movable trolley shown in this construction is similar to the trolley 31 and the carriage 35 will be the same as in the other modifications.

By the arrangement shown in Figs. 1 and 2 the cable-way is adapted to cover an area having a width as great as 1500 feet and it will be seen that there is no limit to the length to which the tracks 33 may be extended.

In accordance with the provisions of the patent statutes, I have described the principles of my invention and shown various applications thereof, but I desire to have it understood that I do not wish to be limited to the precise constructions shown.

What I claim is:

1. In an apparatus of the class described, the combination of supports, a movable car on one of said supports, a suspension cable having one end secured to said car and its other end carried on the other of said supports, a carriage on said suspension cable, a power cable running through said carriage, a cable for moving said car and leading to said carriage, and means on said carriage for transmitting power from said power cable to said car moving cable.

2. In an apparatus of the class described, the combination of supports, a movable car on one of said supports, a suspension cable having one end secured to said car and its other end carried on the other of said supports, a carriage on said suspension cable, an endless power cable having portions running in opposite directions through said carriage, a cable for moving said car and leading to said carriage, and means on said carriage for transmitting power from said power cable to said car moving cable.

3. In an apparatus of the class described, the combination of supports, a pair of tracks carried by said supports, movable cars on each of said tracks, a suspension cable having its ends secured to said cars, a carriage on said suspension cable, a cable passing through said carriage and operatively connected with said cars to move the same on said tracks, means for supplying power to said carriage, and means on said carriage for transmitting power to said car moving cable.

4. In an apparatus of the class described, the combination of supports, a pair of tracks carried by said supports, movable cars on said tracks, a suspension cable having its ends secured to said cars, a carriage on said suspension cable, an endless cable passing through said carriage and operatively connected with said cars to move the same on said tracks, an endless power cable passing through said carriage and around wheels on said cars, means for driving said power cable, and means on said carriage for transmitting power from said power cable to said car moving cable.

5. In an apparatus of the class described, the combination of supports, a pair of tracks carried by said supports, movable cars on said tracks, a suspension cable having its ends secured to said cars, a carriage on said suspension cable, an endless cable having portions thereof passing in opposite directions through said carriage and operatively connected with said cars for moving the same on said tracks, an endless power cable having portions thereof passing in opposite directions through said carriage and around wheels on said cars, power means on one of said cars for driving said power cable, and means on said carriage for transmitting power from said power cable to said car moving cable to move said cars on said track.

6. In an apparatus of the class described, the combination of supports, a movable car on one of said supports, a suspension cable having one end secured to said car and its other end carried on the other of said supports, a carriage on said suspension cable, an endless power cable passing through said carriage and engaging wheels on said car and said other support, traction wheels on said car, sheaves operatively connected with said traction wheels, a car moving cable engaging said sheaves and passing through said carriage and around a wheel on said other support, and means on said carriage for transmitting power from said power cable to said car moving cable.

7. In an apparatus of the class described, the combination of supports, a pair of tracks on said supports, movable cars on said tracks, a suspension cable having its ends secured to said cars, a carriage on said suspension cable, an endless power cable passing through said carriage and around wheels on said cars, means on one of said cars for driving said power cable, traction wheels on said cars, sheaves operatively connected with said traction wheels, a car moving cable passing through said carriage and around said sheaves, and means on said carriage for transmitting power from said power cable to said car moving cable in order to move said cars on said tracks.

8. In an apparatus of the class described, the combination of supports, a suspension cable carried by said supports, a carriage on said suspension cable, an endless power cable passing through said carriage and around wheels on said supports, hoisting mechanism on said carriage and means for transmitting power from said power cable to said hoisting mechanism.

9. In an apparatus of the class described, the combination of supports, a suspension cable carried by said supports, a carriage on said suspension cable, an endless power cable passing around wheels on said supports and said carriage, a winding drum on said carriage, and means for driving said winding drum from said power cable wheel on said carriage.

10. In an apparatus of the class described, the combination of supports, a suspension cable carried by said supports, a carriage on said suspension cable, a pair of cable drums on said carriage, cable drums on said supports, an endless power cable passing around said drums, a hoisting drum on said carriage, means for driving said hoisting drum from one or both of said cable drums on said carriage, and a brake adapted to prevent said hoisting drum from turning.

11. In an apparatus of the class described, the combination of supports, a suspension cable carried by said supports, a carriage on said suspension cable, cable drums on said carriage, an endless power cable passing around said cable drums and carried by said supports, means for driving said power cable, a hoisting rope carried by said carriage, means adapted to be driven by said power cable for taking up said hoisting rope, and means on said carriage for gripping said power cable so as to move said carriage.

12. In an apparatus of the class described, the combination of supports, a movable car on one of said supports, a suspension cable having one of its ends secured to said car and its other end carried on the other of said supports, a carriage on said suspension cable, cable drums on said carriage, an endless power cable passing around said drums and carried by said car and said other support, means for driving said power cable, a hoisting drum on said carriage, means for driving said hoisting drum from said cable drums, and means on said carriage for gripping said power cable so as to move said carriage.

13. In an apparatus of the class described, the combination of supports, a movable car on one of said supports, a suspension cable having one of its ends secured to said car and its other end carried on the other of said supports, a carriage on said suspension cable, a power cable carried by said car and said other support and passing through said carriage, a car moving cable passing through said carriage and operatively connected with said car, and means on said carriage for gripping said power cable and said car moving cable whereby said carriage and said car are moved simultaneously.

14. In an apparatus of the class described, the combination of supports, movable cars on said supports, a suspension cable carried by said cars, a carriage on said suspension cable, a power cable carried by said cars and passing through said carriage, a car moving cable passing through said carriage and operatively connected with said cars, and means on said carriage for gripping said power cable and said car moving cable whereby said carriage and said cars are moved simultaneously.

15. In an apparatus of the class described, the combination of supports, a movable car on one of said supports, a suspension cable having one of its ends secured to said car and its other end carried on the other of said supports, a carriage on said suspension cable, an endless power cable carried by said car and said other support and having portions thereof passing in opposite directions through said carriage, an endless car moving cable operatively connected with said car and having oppositely arranged portions passing through said carriage, and means on said carriage for gripping said cables whereby said carriage may be moved in either direction and said car may be moved in either direction.

16. In an apparatus of the class described, the combination of a carriage, a support for said carriage, means for moving said support, means for moving said carriage on said support, and means for connecting said carriage with said support moving means whereby the latter is operated by the movement of said carriage on said support.

17. In an apparatus of the class described, the combination of supports, a track carried by one of said supports, a movable car on said track, a suspension cable secured to said car and having a carriage thereon, a motor carried by said car, a pair of cable drums mounted on said car and adapted to be driven by said motor, an endless power cable arranged on said drums and extending through said carriage to the other of said supports, traction wheels on said car and engaging said track, a sheave operatively connected with one of said traction wheels and having a cable arranged thereon and passing through said carriage, and means on said carriage for connecting said cables to move said car.

18. In an apparatus of the class described, the combination of supports, a movable car on one of said supports, a suspension cable having one of its ends secured to said car and its other end carried by the other of said supports, a carriage on said suspension cable and having hoisting mechanism thereon, an endless power cable having portions thereof running in opposite directions through said carriage and arranged on return sheaves on said car and said other support, an endless car moving cable arranged on return sheaves on said car and said other support and having opposite portions extending through said carriage, and means on said carriage for gripping said cables whereby said carriage is adapted to be moved in either direction and the movement of said carriage in either direction is adapted to move said car in either direction.

19. In an apparatus of the class described, the combination of supports, movable cars on said supports, a suspension cable secured to said cars, a carriage on said suspension cable and having hoisting mechanism thereon, an endless power cable having portions thereof running in opposite directions through said carriage and arranged on return sheaves on said cars, an endless car moving cable arranged on return sheaves on said cars and having opposite portions extending through said carriage, and means on said carriage for gripping said cables whereby said carriage is adapted to be moved in either direction, and the movement of said carriage in either direction is adapted to move said cars together in either direction.

20. In an apparatus of the class described, the combination of a movable carriage, a movable support for said carriage, hoisting mechanism on said carriage, an endless power cable passing through said carriage, and means whereby said carriage, support, and hoisting mechanism are adapted to be operated by said power cable.

21. In an apparatus of the class described, the combination of a movable carriage, a movable support for said carriage, hoisting mechanism on said carriage, an endless power cable passing through said carriage, means for operating said carriage, support, and hoisting mechanism from said power cable and all of said operating means being adapted to be controlled from said carriage.

22. In an apparatus of the class described, the combination of a movable carriage, a movable support for said carriage, hoisting mechanism on said carriage, an endless power cable passing through said carriage, means adapted to simultaneously operate said carriage, support, and hoisting mechanism from said power cable, and all of said operating means being adapted to be controlled from said carriage.

In testimony whereof I affix my signature in presence of two witnesses.

WILLIE GRAHAM.

Witnesses:
M. A. KEIR,
A. M. BUCHMANN.